United States Patent [19]

Guerdoux

[11] Patent Number: 5,070,145

[45] Date of Patent: Dec. 3, 1991

[54] MULTI-PHASE THERMOPLASTIC COMPOSITIONS AND ARTICLES OBTAINED THEREFROM

[75] Inventor: Lionel Guerdoux, Lillebonne, France

[73] Assignee: Societe Chimique Des Charbonnages S.A., Cedex, France

[21] Appl. No.: 445,935

[22] Filed: Dec. 5, 1989

Related U.S. Application Data

[63] Continuation of Ser. No. 112,036, Oct. 23, 1987, abandoned, which is a continuation-in-part of Ser. No. 938,246, Dec. 5, 1986, abandoned.

[30] Foreign Application Priority Data

Apr. 23, 1985 [FR] France .................................. 85 06105

[51] Int. Cl.⁵ ............................................. C08L 77/00
[52] U.S. Cl. ..................................... 525/179; 524/514; 525/183
[58] Field of Search .......................... 525/179; 524/514

[56] References Cited

U.S. PATENT DOCUMENTS 3,373,223 3/1968 Armstrong ........................... 525/179
4,160,790 7/1979 Mason et al. ........................ 525/179
4,174,358 11/1979 Epstein ................................. 525/184
4,554,320 11/1985 Reimann et al. ..................... 525/183

FOREIGN PATENT DOCUMENTS 0072480 2/1983 European Pat. Off. .

Primary Examiner—Ana L. Carrillo
Attorney, Agent, or Firm—Finnegan, Henderson, Farabow, Garrett & Dunner

[57] ABSTRACT

Compositions comprising from 50 to 95% by weight of at least one polyamide resin, and from 5 to 50% by weight % of a polymer composition comprising from 84 to 99.1 mole % of units derived from ethylene and from 0.9 to 16 mole % of units derived from an unsaturated anhydride of a dicarboxylic acid and optionally from at least one of an alkyl acrylate or methacrylate whose alkyl group has from 1 to 8 carbon atoms. The polymer composition is present in the form of a mixture of (A) a polymer of ethylene and (B) a copolymer of ethylene and an unsaturated anhydride of a dicarboxylic acid. The weight ratio (A) to (B) lies between 1 to 6 and 6 to 1.

Application is to the production of articles having an improved impact resistance.

7 Claims, No Drawings

MULTI-PHASE THERMOPLASTIC COMPOSITIONS AND ARTICLES OBTAINED THEREFROM

This application is a continuation of application Ser. No. 07/112,036 filed Oct. 23, 1987, now abandoned, which is a continuation-in-part of application Ser. No. 938,246, filed Dec. 5, 1986, now abandoned.

The present invention relates to multi-phase thermoplastic compositions with improved impact-related properties, and to articles made from said compositions.

Compositions which comprise a matrix of polyamides and ethylene polymers are already known for their impact resistance. In particular, the document EP-A-096.264 describes a material of high impact resistance containing:

(A) a thermoplastic nylon having a relative viscosity of from 2.5 to 5, and (B) from 5 to 60% by weight, with respect to (A), of a non-crosslinked ternary copolymer consisting of:
 (a) 55 to 79.5% by weight of ethylene,
 (b) 20 to 40% by weight of at least one primary or secondary alkyl (meth) acrylate, and
 (c) 0.5 to 8% by weight of a monomer having an acid function (e.g. maleic anhydride).

Document EP-A-072.480 is also known, and describes an impact-resistant composition comprising from 50 to 90% by weight of polyamide, from 1 to 45% by weight of an ionomeric ethylene resin and from 0.5 to 40% by weight of an elastomeric ethylene copolymer.

Finally, document U.S. Pat. No. 3,373,223 describes a mixture of polymers consisting of essentially 25 to 90% by weight of polyolefine 5 to 70% by weight of polyamide and 1 to 10% by weight of a copolymer of ethylene and (meth)acrylic acid.

However, although these compositions exhibit an improved impact resistance compared with a matrix of polyamide used alone, this improvement nevertheless remains insufficient for numerous applications which require an excellent impact resistance.

The object of the present invention therefore is to obtain multi-phase thermoplastic compositions having an excellent impact resistance, especially at low temperature.

A first object of the present invention is compositions comprising from 50 to 95% by weight of at least one polyamide resin and from 5 to 50 weight % of a polymer composition comprising from 84 to 99.1 mole % of units derived from ethylene and from 0.9 to 16 mole % of units derived from an unsaturated anhydride of a dicarboxylic acid and optionally from at least one of an alkyl acrylate or methacrylate whose alkyl group has from 1 to 8 carbon atoms. The polymer composition is in the form of a mixture of:

(A) a polymer of ethylene and optionally an alkyl acrylate or methacrylate, and (B) a copolymer of ethylene and an unsaturated anhydride of a dicarboxylic acid, and optionally an alkyl acrylate or methacrylate.

The weight ratio of (A) to (B) lies between 1 to 6 and 6 to 1.

According to one preferred embodiment of the present invention the copolymer (A) comprises from 0 to 20 mole percent of units derived from alkyl acrylate or methacrylate, and has a melt index (measured according to ASTM D 1238-73) lying between 1 and 50 dg/min.

According to a preferred embodiment of the present invention the terpolymer (B) comprises from 0.3 to 2 mole per cent of units derived from maleic anhydride and from 0 to 3 mole % of units derived from an alkyl acrylate or methacrylate; and has a melt index according to ASTMD 1238-73 of between 1 and 500 dg/min and preferably between 2 and 50 dg/min.

Practice has shown that the polyamide matrix compositions containing polyolefine compounds known up to the present have an impact resistance which is improved but still insufficient for certain applications. The applicant has discovered that the use, as an ethylene polymer, of a mixture disclosed above of a polymer (A) and a copolymer (B) permits a surprising and appreciable improvement in the impact resistance over compositions known up to the present, especially at low temperature.

According to the invention, a polyamide resin is to be understood in the conventional way as a resin produced by condensation of equimolar quantities of a saturated dicarboxylic acid containing from 4 to 12 carbon atoms, with a diamine containing from 4 to 14 carbon atoms. An excess of diamine can be used, so as to obtain an excess of terminal amine groups in the polyamide, over terminal carboxyl groups. Examples of polyamides include polyhexamethylene adipamide (nylon 66), polyhexamethylene sebacic acid amide (nylon 610) and polyhexamethylene dodecanoic acid amide (nylon 612), the polyamides produced by decyclisation of lactams, i.e. polycaprolactam, poly(laurolactam) poly(11-amino undecanoic acid), bis-(para-aminocyclohexyl) methane dodecanoic acid amide. It is also possible to use in the present invention polyamides prepared by condensation of at least two of the above polymers or their constitutents. These resins have a molecular weigth of at least 5000, and for preference, a melting point above or equal to 200° C.

Stabilizers, mould release agents, lubricants, crystallization accelerators, plasticizers, pigments, colourants or mineral fillers can be incorporated in the compositions.

According to one variant it is thus possible to make the above described compositions rigid by adding to them a significant proportion of mineral fillers, advantageously up to 50 parts by weight of at least one mineral filler per 100 parts by weight of the total of polyamide resin, copolymer and terpolymer. The mineral filler, powdered or present as fibres or flakes can be chosen, for example, from among glass fibres, glass beads, mica, talc, clays, aluminates and silicates, e.g. of calcium, or from among alumina, alumina hydrate, carbon black, carbon or boron fibres, asbestos, the oxide, hydroxide, carbonate and sulfate of magnesium or calcium, the oxides of iron, antimony, zinc, titanium dioxide, barium sulfate, bentonite, diatomaceous earth, kaolin, silica such as quartz, and feldspar.

The composition provided by the present invention is obtained in known manner by any molten state mixing technique such as, for example, extrusion or working in an internal mixer.

A second object of the present invention relates to articles made from at least one composition described above. These articles can be obtained by all conventional methods used in the thermoplastics industry, especially injection moulded articles or those obtained by extrusion (film, tubes, slabs, fibres etc).

The multi-phase thermoplastic compositions obtained within the scope of the present invention possess a notably improved impact resistance which makes them specially interesting for all applications in which that property is required, especially in the field of the automobile and electronics industries, appliances for household or industrial usage, and sporting articles.

The non-limiting examples which appear below are intended to illustrate the invention. The standard used for defining the Charpy impact strength (expressed in kilojoules per square meter) is the ISO R 179 standard, on a gauge marked $4\times6\times50$ mm$^3$ (gauge type 2C). Parts are parts by weight.

EXAMPLE 1 (COMPARATIVE)

A first standard composition is examined consisting of 80 parts of polyamide 6, marketed by the firm BASF under the trade designation "Ultramid B3", and 20 parts of an ethylene/ethyl acrylate copolymer having a melt index equal to 10.5 dg/min, in which the molar proportion of ethyl acrylate is 7.3%. Mixing is carried out on a TROESTER extruder (D=60 mm; L/D=27) at a speed of 25 rpm and a temperature of 275° C. The composition obtained is subsequently injected on a NETSTAL machine at a temperature of 280° C. in the jacket; the duration of the injection cycle is 18 seconds and the injection pressure 800 bar. The mould temperature is 20° C. The impact strengths IS obtained are expressed in kJ/m$^2$ as a function of the temperature T expressed in °C., in the table which follows.

EXAMPLE 2 (COMPARATIVE)

A standard composition is prepared in the operating conditions of example 1 and consists of:
80 parts of the polyamide 6 used in example 1,
20 parts of terpolymer with a melt index of 5.2 dg/min containing 1.7 mole per cent ethyl acrylate and 0.8 mole per cent maleic anhydride.

The composition obtained exhibits a Charpy impact strength IS expressed in KJ/m$^2$ as a function of the temperature T in °C., in the table which follows.

EXAMPLE 3

In the operating conditions of example 1 there are mixed:
80 parts of the polyamide 6 used in example 1,
20 parts of a polymer consisting of equal parts of the copolymer used in example 1 and the terpolymer used in example 2.

The composition obtained exhibits a Charpy impact strength IS expressed in kJ/m$^2$ as a function of the temperature T in °C., in the table which follows.

EXAMPLE 4 (COMPARATIVE)

In the operating conditions of example 1 a standard composition is prepared consisting of:
80 parts of polyamide 66 marketed by the firm BASF under the trade designation "Ultramid A3",
20 parts of the copolymer used in example 1.

The composition obtained exhibits a Charpy impact strength IS expressed in kJ/m$^2$ as a function of the temperature T in °C., in the table which follows.

EXAMPLE 5 (COMPARATIVE)

In the operating conditions of example 1 a standard composition is prepared consisting of:
80 parts of the polyamide 66 used in example 4,
20 parts of the terpolymer used in example 2.

The composition obtained exhibits a Charpy impact strength IS expressed in kJ/m$^2$ as a function of the temperature T in °C., in the table which follows.

EXAMPLE 6

In the operating conditions of example 1 there are mixed together:
80 parts of the polyamide 66 used in example 4,
20 parts of a polymer consisting of equal parts of the copolymer used in example 1 and the terpolymer used in example 2.

The composition obtained exhibits a Charpy impact strength IS expressed in kJ/m$^2$ as a function of the temperature T in °C., in the table which follows.

TABLE

| T | Values obtained for IS Example | | | | | |
|---|---|---|---|---|---|---|
| | 1 | 2 | 3 | 4 | 5 | 6 |
| 20 | 8.7 | 15.9 | 27.9 | n.d | n.d | n.d |
| 0 | 7.6 | 15.0 | 18.5 | 4.0 | 7.5 | 10.0 |
| −10 | 6.4 | 13.9 | 15.8 | 3.9 | 6.4 | 8.5 |
| −20 | 6.3 | 12.6 | 14.4 | 3.9 | 5.3 | 6.8 |
| −30 | 6.3 | 10.5 | 12.4 | n.d | n.d | 5.9 |
| −40 | n.d | 9.0 | 10.4 | n.d | n.d | 5.9 | n.d = not determined

EXAMPLE 7 (COMPARATIVE)

A reference composition is prepared consisting of:
80 parts by weight of the polyamide 66 used in Example 4,
20 parts by weight of an ethylene/N-butylacrylate copolymer having an acrylate content of 28 weight % and a melt index of 2.5 dg/min., which is marketed under the trade name Lotader 3600 by CDF Chimie Terpolymeres.

The preparation of this composition is carried out by mixing in a coextruder buss PR 46B at the rate of 10 R.P.M. and at a temperature of 280° C. The composition obtained is then injected in an Engel injection-molding machine at a temperature of 280° C., the duration of the injection cycle being 18 seconds and the injection pressure being 800 bars. The mold is cooled at 20° C. by circulating water.

The impact strength (I.S.) of the obtained composition is expressed in Table II below in terms of the measurement temperature (T).

EXAMPLE 8 (COMPARATIVE)

Using the conditions of Example 7, a reference composition is prepared consisting of:
80 parts by weight of the polyamide 66 used in Example 4,
20 parts by weight of a terpolymer having a melt index of 40 dg/min. and comprising 72 weight % ethylene units, 25 weight % ethylacrylate units and 3 weight % maleic anhydride, which is marketed under the trade name Lotader 6600 by CDF Chimie Terpolymeres.

The impact strength (I.S.) of the obtained composition is expressed in Table II below in terms of the temperature (T).

EXAMPLE 9

Using the conditions of Example 7, a composition is prepared consisting of:
80 parts by weight of the polyamide 66 used in Example 4,
20 parts by weight of a polymer mixture comprising 85 weight % of the copolymer used in Example 7 and 15 weight % of the terpolymer used in Example 8.

The impact strength (I.S.) of the obtained composition is expressed in Table II below in terms of the temperature (T).

EXAMPLE 10 (COMPARATIVE)

Using the conditions of example 7, a composition is prepared consisting of:
- 80 parts by weight of the polyamide 66 used in Example 4,
- 20 parts by weight of a terpolymer having a melt index of 5 dg/min. and comprising 70 weight % ethylene units, 28 weight % ethylacrylate units and 2 weight % maleic anhydride units, which is marketed under the trade name Lotader 3700 by CDF Chimie Terpolymeres.

The impact strength (I.S.) of the obtained composition is expressed in Table II below in terms of the temperature (T).

EXAMPLE 11

Using the conditions of Example 7, a composition is prepared consisting of:
- 80 parts by weight of the polyamide 66 used in Example 4,
- 20 parts by weight of a polymer mixture comprising 80 weight % of the terpolymer used in Example 10 and 20 weight % of an ethylene homopolymer having a density of 0.918 and a melt index of 7 dg/min., which is marketed under the trade name Lotrene LA 0710 by CDF Chimie Ethylene et Plastiques.

The impact strength (I.S.) of the obtained composition is expressed in Table II below in terms of the temperature (T).

TABLE II

| T | EX. 7 | EX. 8 | EX. 9 | EX. 10 | EX. 11 |
|---|---|---|---|---|---|
| +20 | 8.7 | 19.2 | N.M. | 28.8 | 31.0 |
| 0 | 5.5 | 17.6 | 10.6 | 16.8 | 16.7 |
| −20 | 4.5 | 12.6 | 9.2 | 12.7 | 11.3 |
| −40 | 4.1 | 9.5 | 8.7 | 9.4 | 9.8 |

N.M.: Not Measured

I claim:

1. A composition comprising from 50 to 95% by weight of at least one polyamide resin and from 5 to 50% by weight of a polymer composition comprising from 84 to 99.1 mole % of units derived from ethylene and from 0.9 to 16 mole % of units derived from an unsaturated anhydride of a dicarboxylic acid and from at least one alkyl acrylate or methacrylate wherein the alkyl group has 1 to 8 carbon atoms, the polymer composition being present in the form of a mixture of:
   (A) an ethylene homopolymer or an ethylene copolymer comprising ethylene and 20 mole % or less of units derived from alkyl acrylate or methacrylate wherein the alkyl group has 1 to 8 carbon atoms, the homopolymer and the copolymer having a melt index between 1 and 50 dg/min; and
   (B) a terpolymer of (i) ethylene, (ii) 0.3 to 2 mole % maleic anhydride, and (iii) 0.3 to 3 mole % of units derived from an alkyl acrylate or methacrylate wherein the alkyl group has 1 to 8 carbon atoms, the terpolymer having a melt index between 1 and 50 dg/min., the weight ratio (A) to (B) being between 1 to 6 and 6 to 1.

2. The composition of claim 1, wherein the melt index of the terpolymer (B) is between 2 and 50 dg/min.

3. The composition of claim 1 further comprising up to 50 parts by weight of at least one mineral filler per 100 parts by weight of the total polyamide resin, ethylene homopolymer or ethylene copolymer (A), and terpolymer (B).

4. The composition of claim 2 further comprising up to 50 parts by weight of at least one mineral filler per 100 parts by weight of the total polyamide resin, ethylene homopolymer or ethylene copolymer (A), terpolymer (B).

5. An article made from the composition of claim 1.
6. An article made from the composition of claim 2.
7. An article made from the composition of claim 3.

* * * * *

UNITED STATES PATENT AND TRADEMARK OFFICE
CERTIFICATE OF CORRECTION

PATENT NO. : 5,070,145
DATED : December 3, 1991
INVENTOR(S) : Lionel GUERDOUX

It is certified that error appears in the above-identified patent and that said Letters Patent is hereby corrected as shown below:

Claim 4, col. 6, line 40: after "(A)," insert --and--.

Signed and Sealed this

Sixth Day of April, 1993

*Attest:*

STEPHEN G. KUNIN

*Attesting Officer*  *Acting Commissioner of Patents and Trademarks*